(12) United States Patent
Furukawa et al.

(10) Patent No.: US 9,021,993 B2
(45) Date of Patent: May 5, 2015

(54) WATER HEATER AND FLOW RATE CONTROL METHOD

(75) Inventors: Seiji Furukawa, Tokyo (JP); Kazuhiro Miya, Tokyo (JP); Toshiyuki Kamiya, Tokyo (JP); Tadashi Saito, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 14/009,299

(22) PCT Filed: Apr. 1, 2011

(86) PCT No.: PCT/JP2011/058459
§ 371 (c)(1),
(2), (4) Date: Oct. 1, 2013

(87) PCT Pub. No.: WO2012/137281
PCT Pub. Date: Oct. 11, 2012

(65) Prior Publication Data
US 2014/0144607 A1    May 29, 2014

(51) Int. Cl.
*F24H 9/20* (2006.01)
*F28G 7/00* (2006.01)
*F28F 19/00* (2006.01)
*F24D 19/00* (2006.01)

(52) U.S. Cl.
CPC . *F28G 7/00* (2013.01); *F28F 19/00* (2013.01); *F24H 9/2021* (2013.01); *F24D 19/0092* (2013.01)

(58) Field of Classification Search
CPC .............. F24H 4/04; F24H 1/10; F24H 7/04; F24H 9/124; F24H 9/128

USPC ........ 122/20 R, 14.3, 14.31, 15.1, 18.1, 18.2, 122/19.1, 31.1, 36
See application file for complete search history.

(56) References Cited

U.S. PATENT DOCUMENTS 3,939,803 A * 2/1976 Meissner et al. ............. 122/31.1
4,347,972 A * 9/1982 Hillerstrom et al. ............ 236/18
(Continued)

FOREIGN PATENT DOCUMENTS

JP    2005 221109    8/2005
JP    2005 308235    11/2005
(Continued)

OTHER PUBLICATIONS

International Search Report Issued Jun. 28, 2011 in PCT/JP11/58459 filed Apr. 1, 2011.

*Primary Examiner* — Gregory A Wilson
(74) *Attorney, Agent, or Firm* — Oblon, McClelland, Maier & Neustadt, L.L.P.

(57) ABSTRACT

A water heater in which by applying pulsation of a liquid to be heated which circulates between a tank and a heat exchanger, scale that has been deposited on the inner wall (heat-transfer surface) of a to-be-heated liquid flow channel in a heat exchanger is detached, and the number of times of circulation of the liquid to be heated which circulates between the tank and the heat exchanger is controlled to be three times or less. The number of times of circulation is determined, based on the entire volume of the to-be-heated liquid stored in the tank, a boiling time to be taken for the entire volume of the to-be-heated liquid in the tank to reach a predetermined temperature, and the flow rate of the to-be-heated liquid which passes through the to-be-heated liquid flow channel.

10 Claims, 8 Drawing Sheets

(56) References Cited

U.S. PATENT DOCUMENTS

| | | | |
|---|---|---|---|
| 4,959,526 A * | 9/1990 | Kurachi et al. | 392/462 |
| 5,115,491 A * | 5/1992 | Perlman et al. | 392/454 |
| 6,283,067 B1 * | 9/2001 | Akkala | 122/14.22 |
| 6,827,091 B2 * | 12/2004 | Harrison | 134/22.18 |
| 7,726,263 B2 * | 6/2010 | Ben-Ishai | 122/20 R |
| 2008/0073063 A1 * | 3/2008 | Clavenna et al. | 165/84 |
| 2011/0283728 A1 * | 11/2011 | Furukawa et al. | 62/238.7 |
| 2014/0021033 A1 * | 1/2014 | Frick | 203/12 |

FOREIGN PATENT DOCUMENTS

| | | |
|---|---|---|
| JP | 2006 125654 | 5/2006 |
| JP | 2009 243797 | 10/2009 |
| JP | 2010 91123 | 4/2010 |
| JP | 2010 175160 | 8/2010 |
| WO | 2010 029786 | 3/2010 |

* cited by examiner

WATER HEATER AND FLOW RATE CONTROL METHOD

TECHNICAL FIELD

The present invention relates to a water heater including a function of reducing adhesion of scale to a heating flow channel in a heater for heating a liquid to be heated.

BACKGROUND ART

Water heaters for supplying hot water to a bathroom or a kitchen are broadly classified into electric water heaters, gas water heaters, and oil water heaters. Any of these water heaters includes a portion called heat exchanger for transferring heat to water. Among the electric water heaters, a heat-pump heat-exchange type electric water heater (heat-pump water heater) in particular has recently drawn attention in terms of reduction of carbon dioxide as countermeasures for energy saving and against global warming. The heat-pump water heater operates on the principle that heat in the atmosphere is transferred to a heat medium to heat water with the transferred heat. More specifically, the heat-pump water heater is operated by a repeated operation of a cooling-heating cycle of transferring high heat, which is generated when a gas is compressed, to water through an intermediation of the heat exchanger, and then lowering the temperature of the heat medium back to an atmospheric temperature again with cool air generated when the gas is expanded. Theoretically, a larger amount of heat energy than that of input energy cannot be generated. However, the heat-pump water heater has a mechanism of using the heat in the atmosphere. Thus, a larger amount of heat energy than the amount of energy required for the operation can be used.

It is very important to constantly maintain a heat-transfer surface in a clean state because the heat exchanger transfers the heat to the water. When a wall surface is stained, an effective heat-transfer area is reduced, which in turn lowers heat-transfer performance. When the stain is further accumulated, a flow channel is obstructed in the worst case.

In a region where a large amount of hardness components (calcium ions or magnesium ions) is contained in water, in particular, there is a problem that "scale" mainly comprising carbonate crystal is deposited by heating and tends to adhere to the inner side of the heat exchanger. In a conventional water heater, opening/closing control of a discharge valve on the high-temperature water side of a plate-type heat exchanger, such as full opening of the discharge valve, full closing of the discharge valve, or 20 percent opening of the discharge value, is performed in a cycle of approximately one second. High-temperature water is thereby pulsated to vibrate plates of the plate-type heat exchanger. Residue in a low-temperature water side flow channel is thereby detached and removed (as disclosed in Patent Document 1, for example).

CITATION LIST

Patent Literature

Patent Literature 1: JP 2005-221109

SUMMARY OF INVENTION

Technical Problem

However, there is the following problem in Patent Document 1. That is, even if calcium carbonate scale has been detached by vibrating the plates, the calcium carbonate scale returns to the plate-type heat exchanger through a circulation circuit, and adheres to surfaces of the plates heated by the high-temperature water. Thus, degradation in heat-transfer performance of the plate-type heat exchanger or obstruction of the flow channel cannot be prevented.

An object of the present invention is to provide a water heater in which adhesion of scale to the inside wall of a flow channel for a liquid (water) to be heated in a heater constituting the water heater may be reduced, and lowering of heat-transfer performance and obstruction of the flow channel due to the scale adhesion may be reduced.

Solution to Problem

A water heater of the present invention may comprise:
a tank with a liquid to be heated stored therein;
a heater disposed midway in a to-be-heated liquid piping to form a flow channel through which the to-be-heated liquid flown out from the tank flows into the tank again, the heater including a heating flow channel, the to-be-heated liquid flown out from the tank into the to-be-heated liquid piping flowing into the heating flow channel where a temperature of the to-be-heated liquid is increased, and then the to-be-heated liquid being flown into the to-be-heated piping on an inlet side of the tank; and
a distribution control unit which distributes the to-be-heated liquid stored in the tank into the to-be-heated liquid piping;
the distribution control unit controlling a flow rate of the to-be-heated liquid which passes through the heating flow channel of the heater, thereby pulsating the to-be-heated liquid which passes through the heating flow channel of the heater; and
the distribution control unit controlling the flow rate of the to-be-heated liquid which passes through the heating flow channel of the heater so that an entire volume of the to-be-heated liquid stored in the tank passes through the heater a predetermined number of times or less within a boiling time, the boiling time being set as a time to be taken for the entire volume of the to-be-heated liquid to reach a predetermined temperature.

Advantageous Effects of the Invention

According to the present invention, by applying the pulsation to the flow of the to-be-heated liquid circulating between the hot water supply tank and the heater, scale that has been deposited on the inner wall (heat-transfer surface) of the to-be-heated liquid flow channel in the heater may be detached. Further, by reducing the number of times of circulation of the to-be-heated liquid between the hot water supply tank and the heater, the detached scale may be prevented from adhering to the inner wall of the to-be-heated flow channel in the heater again. This arrangement may clearly reduce lowering of heat transfer performance and obstruction of the flow channel due to readhesion of the scale.

DESCRIPTION OF EMBODIMENTS

Figure 1:
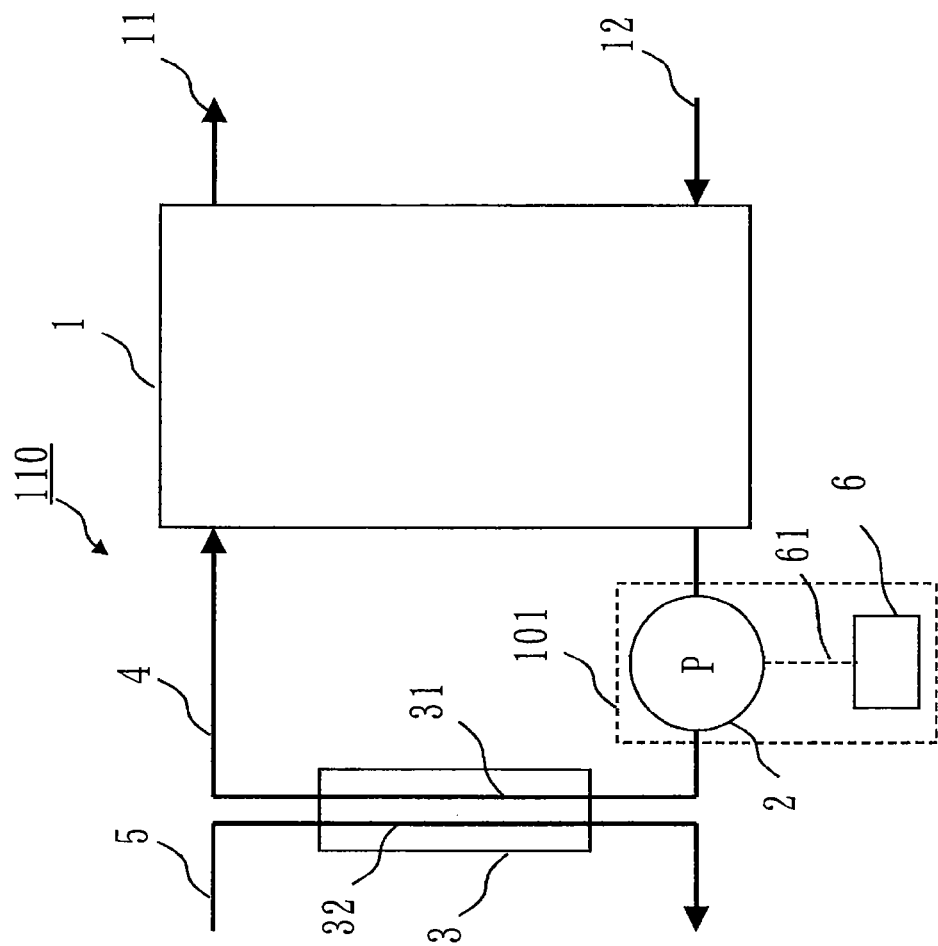
FIG. 1 is a configuration diagram of a water heater 110 in a first embodiment.

A first embodiment will be described with reference to FIGS. 1 to 5.

A configuration and an operation of a water heater 110 in the first embodiment will be described below with reference to FIG. 1. Reference character "L", which will be shown below, represents liter (1 L=1×10$^{-3}$ m$^3$).

First Embodiment

FIG. 1 is a configuration diagram of the water heater 110 in the first embodiment. A tank 1 is provided for storing water which is a liquid to be heated (to-be-heated liquid of a heating target) or hot water obtained by the heating. A pump 2 circulates the water which is the to-be-heated liquid. A heat exchanger 3 (heater) increases a temperature of the water which is the to-be-heated liquid. The heat exchanger 3 is connected to the tank 1 through a to-be-heated liquid circulation piping 4. The heat exchanger 3 is also connected to a heat medium piping 5. That is, a to-be-heated liquid flow channel 31 (heating flow channel) and a heat medium flow channel 32 are in contact with each other in the heat exchanger 3, where heat exchange is performed. As a heat medium, hot water of a high temperature, for example, is employed. However, the heat medium is not limited to this hot water of a high temperature, and carbon dioxide, a fluorocarbon refrigerant, or hydrocarbon-based refrigerant may be employed for the heat medium. A control apparatus 6 is provided for controlling operation of the pump 2, and is connected to the pump 2 through a signal line 61. A hot water discharge piping 11 is a piping for extracting the hot water in the tank 1. A tap water piping 12 is a piping for supplying the water to the tank 1.

Each of the hot water discharge piping 11 and the tap water piping 12 is connected to the tank 1.

In the water heater 110, the water heated by the heat exchanger 3 is stored in the tank 1, and is flown out through the hot water discharge piping 11, if necessary. That is, the hot water to be flown out through the hot water piping 11 is the hot water obtained by direct heating by the heat exchanger 3. This also holds true for water heaters 120 to 140.

The configuration of the water heater 110 will be described in further detail. As shown in FIG. 1, the to-be-heated liquid circulation piping 4 (to-be-heated liquid piping) forms a flow channel through which the to-be-heated liquid that has been flown out from the tank 1 is flown into the tank 1 again. The heat exchanger 3 is disposed midway in the to-be-heated liquid circulation piping 4. The heat exchanger 3 includes the to-be-heated liquid flow channel 31 (heating flow channel). The to-be-heated liquid, which has been flown from the tank 1 into the to-be-heated liquid circulation piping 4, is flown into the to-be-heated liquid flow channel 31. Then, the temperature of the to-be-heated liquid that has been flown into the to-be-heated liquid flow channel 31 is increased by heat exchange with the heat medium flowing in the heat medium flow channel 32. The resulting liquid flows out into the to-be-heated liquid circulation piping 4 on the inlet side of the tank 1. The pump 2 and the control apparatus 6 (pump control apparatus) constitute a distribution control unit 101 configured to distribute the to-be-heated liquid which has been stored in the tank 1 into the to-be-heated liquid circulation piping 4.

The distribution control unit 101 controls a flow rate of the to-be-heated liquid which passes through the to-be-heated liquid flow channel 31 of the heat exchanger 3, thereby pulsating the to-be-heated liquid which passes through the to-be-heated liquid flow channel 31. The distribution control unit 101 controls the flow rate of the to-be-heated liquid which passes through the to-be-heated liquid flow channel 31 of the heat exchanger 3 so that the following arrangement, which will be described later, is made. That is, the control is so performed that, when boiling is performed, the number of times of circulation indicating the number of times at which an entire volume V of the to-be-heated liquid stored in the tank 1 passes through the heat exchanger 3 is a predetermined number of times or less (three times or less in the first embodiment, as will be described later). The number of times of circulation is determined based on the entire volume V(L) of the to-be-heated liquid stored in the tank 1, a boiling time T (min) set as a time to be taken for the entire volume V of the to-be-heated liquid to reach a predetermined temperature, and a flow rate F (L/min) of the to-be-heated liquid that passes through the to-be-heated liquid flow channel 31 of the heat exchanger 3.

Next, the operation of the water heater 110 in the first embodiment will be described, with reference to FIG. 1.

The water, which is the to-be-heated liquid, is introduced into the tank 1 through the tap water piping 12. The water in the tank 1 is sent to the heat exchanger 3 through the pump 2 and the to-be-heated liquid circulation piping 4. While the water is passing through the to-be-heated liquid flow channel 31 in the heat exchanger 3, heat is supplied to the water from the heat medium in the heat medium flow channel 32 that is in contact with the to-be-heated liquid flow channel 31 in the heat exchanger. The temperature of the water is thereby increased. The water whose temperature has been increased, or the hot water returns to the tank 1 through the to-be-heated liquid circulation piping 4 on the inlet side of the tank 1. The heat medium in the heat medium flow channel 32 is sent to a heat pump (not shown herein) through the heat medium piping 5 and is then heated. The heat medium then returns to the heat exchanger 3 through the heat medium piping 5.

Scale Deposition

When the concentration of a hardness component or calcium ions of water is high, a calcium carbonate crystal is deposited. Originally, the temperature of the inner wall of the to-be-heated liquid flow channel 31 in contact with the heat medium flow channel 32 is naturally high, so that calcium carbonate tends to be deposited. Further, the smaller the area of the nucleus of the calcium carbonate crystal in contact with a liquid phase is, the more advantageous (stable) the nucleus of the calcium carbonate crystal is, in terms of energy. Thus, when there is a solid-liquid interface or a foreign matter or a wall surface, the calcium carbonate crystal forms a nucleus such that the calcium carbonate crystal comes in contact with the solid-liquid interface. With such a mechanism, scale is deposited on the inner side of the heat exchanger 3 or on the inner wall (heat-transfer surface) of the to-be-heated liquid flow channel 31.

Boiling Time, Number of Times of Circulation

Herein, a time from when heating of the water in the tank 1 is started to when the entire volume of the to-be-heated liquid in the tank 1 reaches the predetermined temperature is defines as a "boiling time". It is assumed that, during this boiling time, supply of the tap water from the tap water piping 12 and discharge of the hot water from the hot water discharge piping 11 are not performed. During the boiling time, the control apparatus 6 controls the operation of the pump 2 to cause a flow of the water to be pulsated. A mean flow rate, however, is set so that the number of times of circulation is a "predetermined number of times" or less. The "number of times of circulation" is herein defined to be the number of times at which the water in the tank 1 averagely circulates within the closed circuit, and is a value to be obtained by calculation using the following Equation (1):

Number of Times of Circulation=(Mean Flow Rate $F$×Boiling Time $T$)÷(Volume $V$ of Tank 1+Volume of To-be-heated Liquid Circulation Piping 4+Volume of To-be-heated Liquid Flow Channel 31)   Equation (1)

Generally, the volume of the to-be-heated liquid circulation piping 4 and the volume of the to-be-heated liquid flow channel 31 are sufficiently smaller than the volume of the tank 1. Thus, these values may be omitted from the calculation. That is, the number of times of circulation may be calculated according to the following Equation (2). The "volume V of the tank 1" in Equations (1) and (2) are the volume of the to-be-heated liquid stored in the tank 1.

Number of Times of Circulation=(Mean Flow Rate $F$×Boiling Time $T$)÷(Volume $V$ of Tank 1)   Equation (2)

The number of times of circulation to be determined from Equation (1) or Equation (2) listed above is a value indicating the number of times at which the entire volume V of the to-be-heated liquid stored in the tank 1 passes through the heat exchanger 3.

When a portion of the water in the tank 1 is boiled up, the "volume of the tank 1" should be replaced with a "quantity of water whose temperature is to be increased", and the "boiling time" should be replaced with a "time for increasing the temperature of the target quantity of the water to the predetermined temperature". When the quantity of water whose temperature is to be increased is halved, for example, the boiling time is halved. Thus, just if the mean flow rate is set, the number of times of circulation can be determined without alteration.

In the water heater 110 in the first embodiment, by applying pulsation to a water flow that circulates between the tank 1 and the heat exchanger 3, the scale that has been deposited on the inner wall of the to-be-heated liquid flow channel 31 in the heat exchanger 3 is detached. Further, by controlling the number of times of circulation at which the hot water circulates between the tank 1 and the heat exchanger 3, the scale that has been detached is prevented from adhering to the inner wall of the to-be-heated liquid flow channel 31 again. With this arrangement, lowering of heat exchange performance and obstruction of the flow channel due to scale adhesion may be clearly reduced.

The structure and the type of the heat exchanger are not limited to the plate-type heat exchanger. A dual-tube-type heat exchanger, a shell-and-tube type heat exchanger, or the like, as well as the plate-type heat exchanger may be used. The to-be-heated liquid flow channel 31 may be immersed in a hot bath (tank where the heat medium such as the hot water of a high temperature is stored) and heated. Alternatively, the to-be-heated liquid flow channel 31 may be brought into contact with a heating apparatus such as an electric heater.

Next, specific examples (experimental conditions) in the first embodiment will be described.
(1) A stainless tank of a volume of 60 L was used in the experiment, as the tank 1.
(2) A copper pipe with an inner diameter of 12 mm and a length of 10 m was provided as the to-be-heated liquid flow channel 31 of the heat exchanger 3, and this copper pipe was connected by a resin piping.
(3) As the to-be-heated liquid, simulated water with a high hardness (with a hardness of 100 mg-$CaCO_3$/L, M alkalinity of 140 mg-$CaCO_3$/L, PH7.5) adjusted using a common reagent was employed.
(4) The copper pipe of the to-be-heated liquid flow channel 31 was immersed in a stainless hot bath of 40 L to increase the temperature of the simulated water with the high hardness.
(5) An initial temperature of the water in the tank was set to 25° C., and a quantity of heat was applied so that, when the hot water passed through the exit of the copper pipe, the temperature of the hot water was raised to as high as 75° C.
(6) The boiling time T was set to one hour (60 minutes). That is, the water was circulated so that all the water in the tank reached 75° C. after one hour from a start of boiling.
(7) The above-mentioned operations were set to one batch. Then, 72 batches of these operations were repeated to analyze an amount of the scale that had adhered to the inner wall of the copper pipe. Specifically, the scale that had adhered was extracted using 1 mol/L dilute hydrochloric acid. Then, an amount of calcium ions was measured using a high-speed liquid chromatography apparatus. When starting each cycle, all the simulated water with the high hardness that had been heated was discharged once. Then, new simulated water with a high hardness was poured into the tank.

Figure 2:
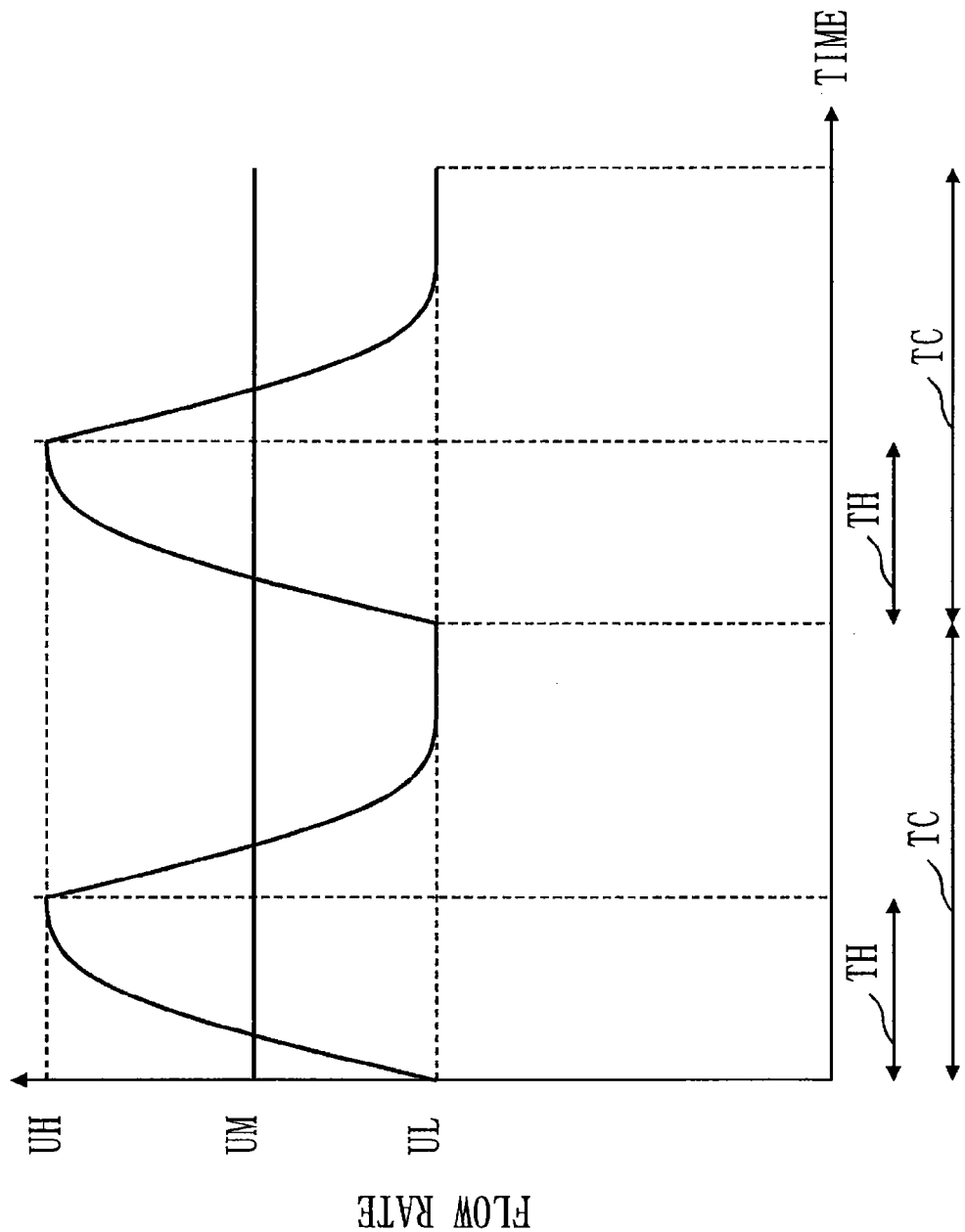
FIG. 2 is a graph showing a time variation of a flow rate of a liquid to be heated, in the first embodiment.

FIG. 2 is a graph schematically showing a time variation of the flow rate of the to-be-heated liquid, when the pulsation has been applied to the to-be-heated liquid. A horizontal axis indicates time, while a vertical axis indicates the flow rate. UH indicates a maximum flow rate, while UL indicates a reference flow rate (minimum flow rate). TC indicates a pulsation cycle time, while TH indicates a time taken for the flow rate of the to-be-heated liquid to reach the maximum flow rate UH from the reference flow rate UL. UM indicates a mean flow rate. UM is determined as a value obtained by dividing, by the pulsation cycle time TC, the integrated flow rate of the to-be-heated liquid to which the pulsation has been applied for a period corresponding to the pulsation cycle time TC. A reference value of each parameter in the following experiments 1 to 3 was set as follows.

Reference Value of Each Parameter in Experiments 1 to 3

UH=1.4 (L/min), UL=0.7 (L/min), UM=1.0 (L/min), TC=5 (seconds), TH=2 (seconds).

Experiment 1

A correlation between the number of times of circulation of the to-be-heated liquid and a scale adhesion amount was examined. The relationship between the number of times of circulation and the flow rate is shown below. According to the above Equation (2), Number of Times of Circulation×Volume V (60 L) of Tank 1=Mean Flow Rate UM×Boiling Time T (60 minutes). Thus, the number of times of circulation=the mean flow rate UM holds.

Number of Times of Circulation 1: UH=1.4 (L/min), UL=0.7 (L/min), UM=1.0 (L/min)

Number of Times of Circulation 2: UH=2.8 (L/min), UL=1.4 (L/min), UM=2.0 (L/min)

Number of Times of Circulation 3: UH=4.2 (L/min), UL=2.1 (L/min), UM=3.0 (L/min)

Number of Times of Circulation 4: UH=5.6 (L/min), UL=2.8 (L/min), UM=4.0 (L/min)

Number of Times of Circulation 5: UH=7.0 (L/min), UL=3.5 (L/min), UM=5.0 (L/min)

Number of Times of Circulation 6: UH=8.4 (L/min), UL=4.2 (L/min), UM=6.0 (L/min)

Figure 3:
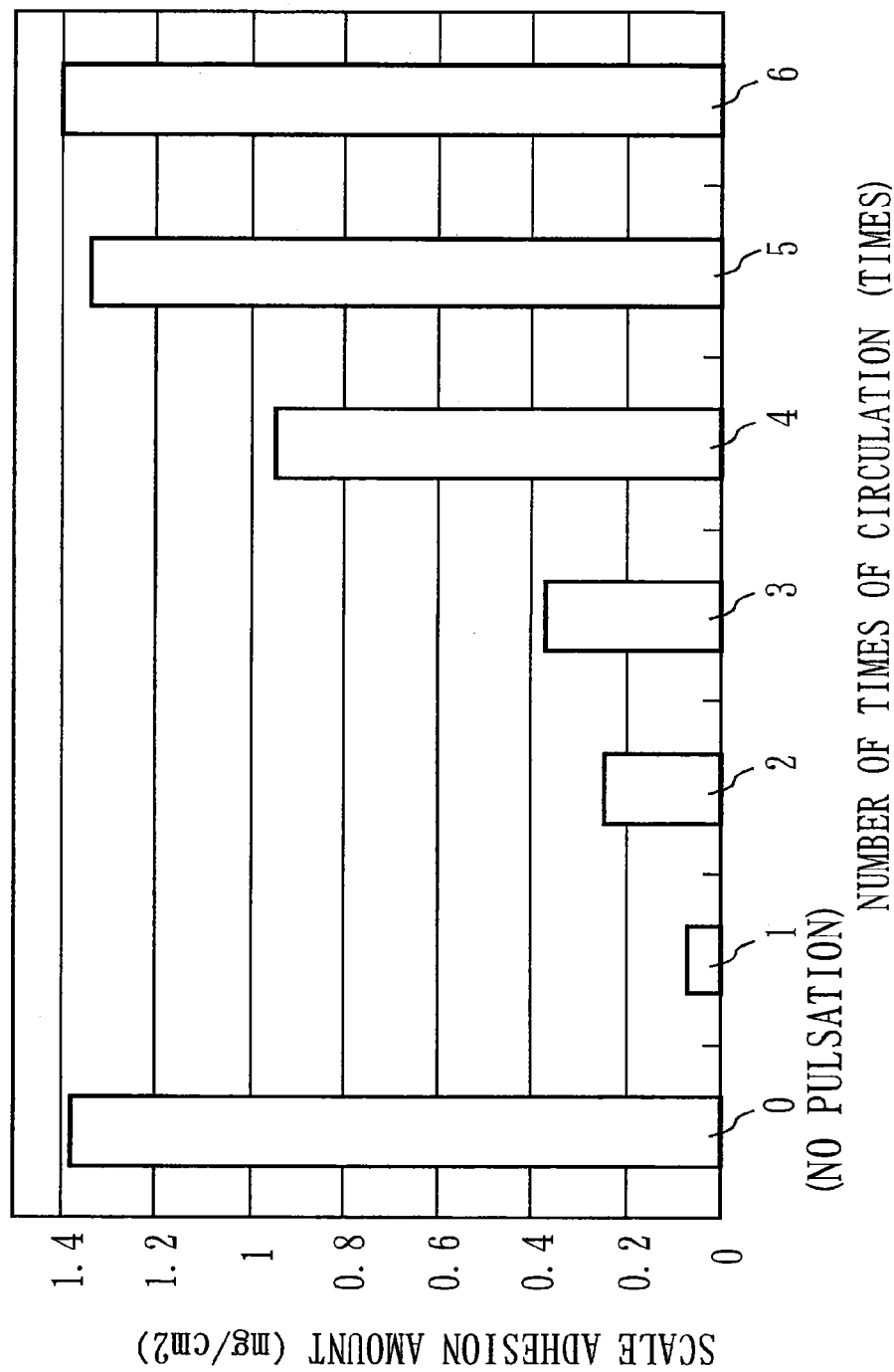
FIG. 3 is a correlation diagram between the number of times of circulation of the to-be-heated liquid and a scale adhesion amount, in the first embodiment.

FIG. 3 shows results of the experiment. For comparison, a scale adhesion amount when no pulsation was applied and the number of times of circulation was set to once is also shown in the same graph. When the number of times of circulation was once, the best result was obtained. However, when the number of times of circulation was three times or less, a high effect of reducing scale adhesion was recognized.

Experiment 2

It was examined how many multiples of the reference flow rate UL the strength of the pulsation or the maximum flow rate UH after the time TH (herein after two seconds) was set to be so as to obtain a high effect of reducing scale adhesion. Experimental conditions that have been set will be shown below.

1.25 times: UH=1.1 (L/min), UL=0.9 (L/min), UM=1.0 (L/min)

1.5 times: UH=1.2 (L/min), UL=0.8 (L/min), UM=1.0 (L/min)

2.0 times: UH=1.4 (L/min), UL=0.7 (L/min), UM=1.0 (L/min)

3.0 times: UH=1.65 (L/min), UL=0.55 (L/min), UM=1.0 (L/min)

Figure 4:
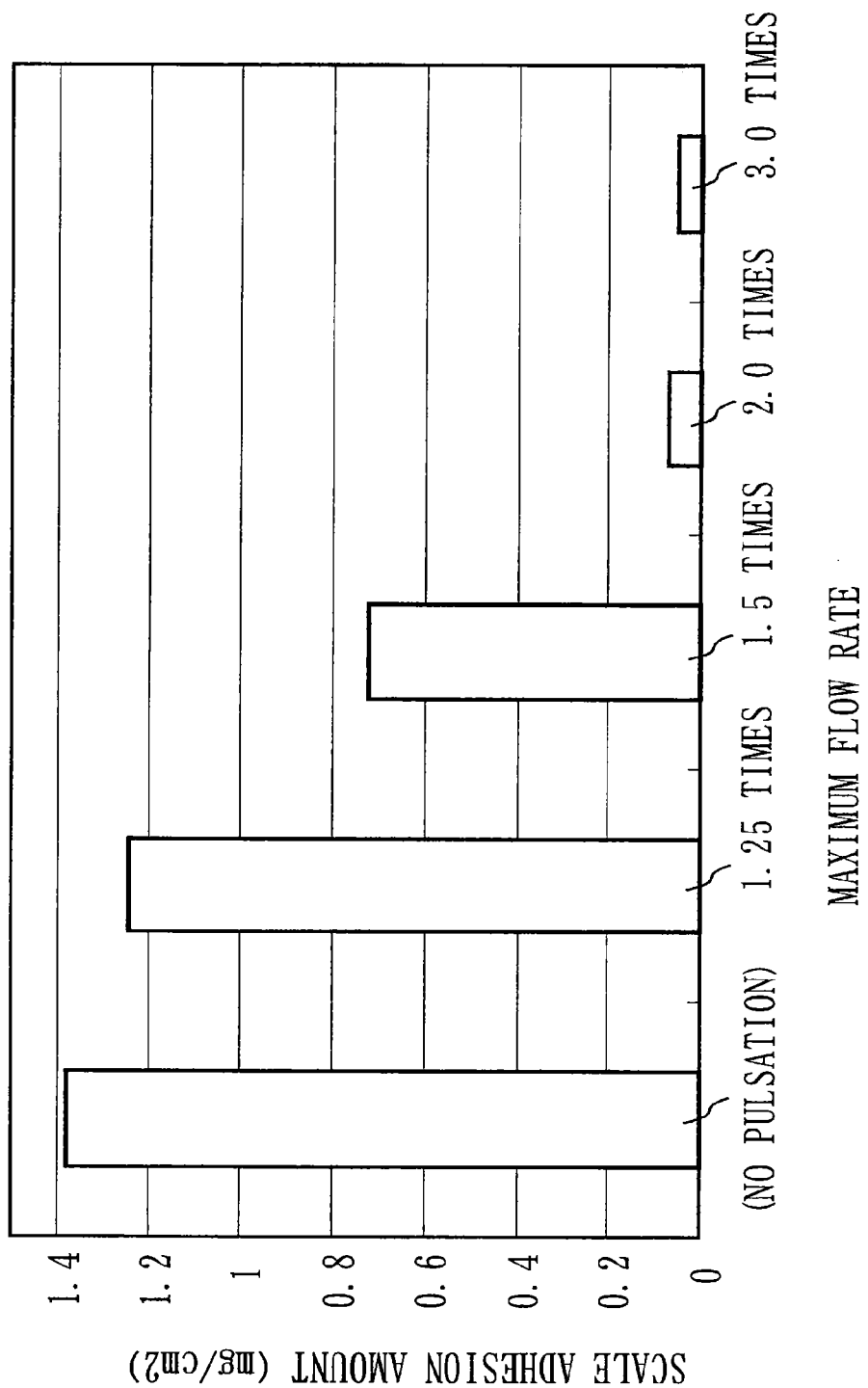
FIG. 4 is a correlation diagram between a maximum flow rate of the to-be-heated liquid and the scale adhesion amount, in the first embodiment.

In all of these conditions, the mean flow rate UM is 1.0 (L/min). Thus, the number of times of circulation under these conditions is once. FIG. 4 shows results of the experiment. For comparison, an amount of scale adhesion when no pulsation was applied and the flow rate was fixed at 1.0 (L/min) is also shown in the same graph. When the maximum flow rate was twice of the reference flow rate or more, the high effect of scale adhesion was recognized.

Experiment 3

The relationship between the pulsation cycle time TC and a scale adhesion amount was examined.

Figure 5:
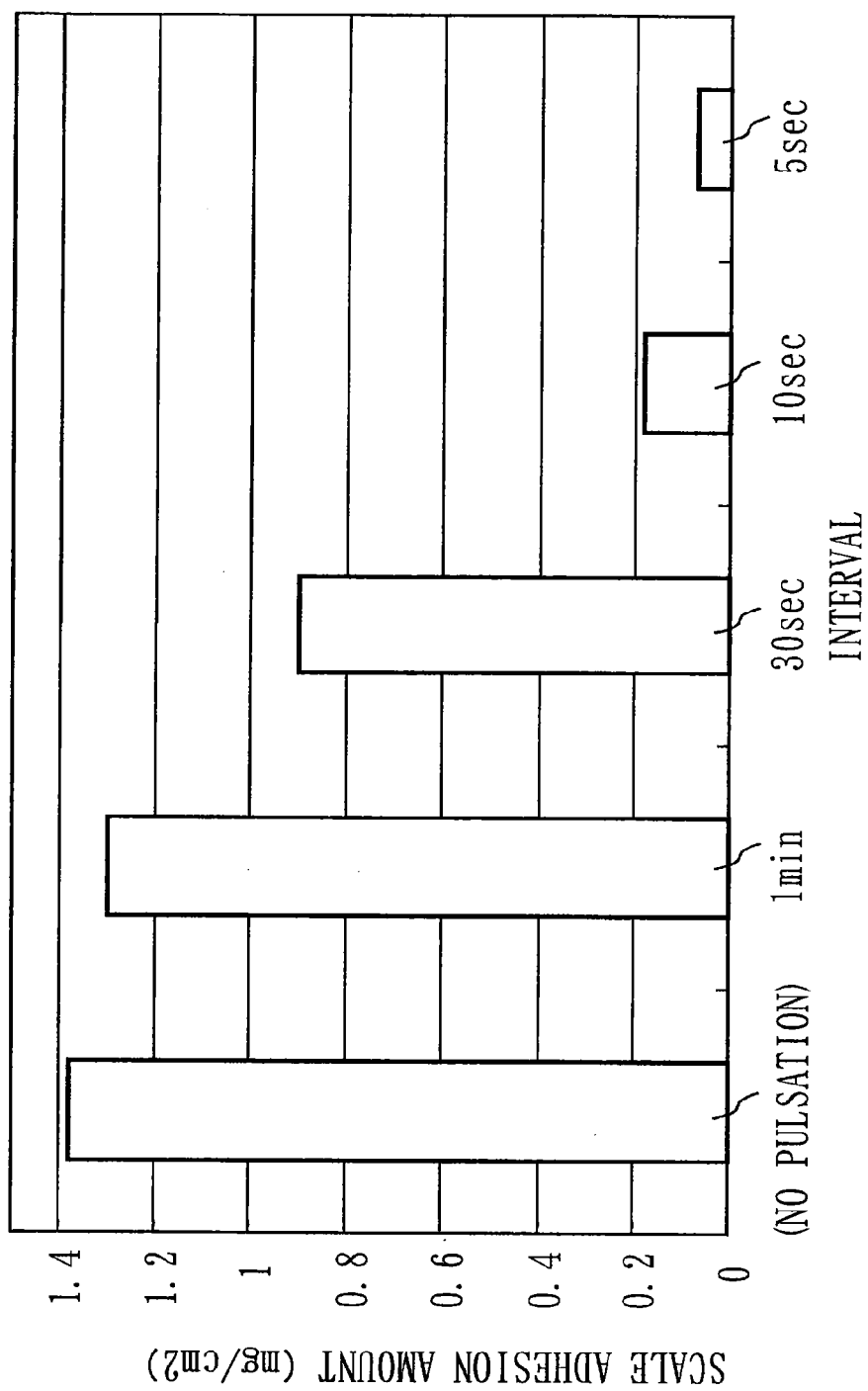
FIG. 5 is a correlation diagram between a pulsation time interval and the scale adhesion amount, in the first embodiment.

FIG. 5 shows results of the experiment. For comparison, a scale adhesion amount when no pulsation was applied and the flow rate was fixed at 1.0 (L/min) is also shown in the same graph. When the pulsation cycle time TC was 10 seconds or less, a high effect of reducing scale adhesion was recognized.

Relationship Between Temperature of Hot Water at Exit of Copper Pipe and Pulsation Condition As shown in Experiment 2, the larger the strength of the pulsation is, the larger the mean flow rate UM is (the larger the number of times of circulation is), and the larger the ratio of the maximum flow rate UH to the reference flow rate UL is. Further, as shown in Experiment 3, the shorter the pulsation cycle time TC is, the higher the effect of reducing scale adhesion is. Meanwhile, there is a concern about whether fluctuation of the flow rate may cause the temperature of the hot water at the exit of the to-be-heated liquid flow channel 31 to become unstable. As a result of examination of stability of the temperature of this hot water as well, the phenomenon that the temperature of the hot water became unstable was not recognized, under the above-shown pulsation conditions of "the number of times of circulation being three times or less", "the maximum flow rate after two seconds is twice of the reference flow rate or more", and "the pulsation cycle time being 10 seconds or less". This means that an influence to be given by the pulsation applied under the above-mentioned conditions is absorbed with respect to the heat capacity held by the to-be-heated liquid in the to-be-heated flow channel.

Even if the capacity of the to-be-heated liquid flow channel 31 is small and the temperature of the hot water at the exit of the to-be-heated liquid flow channel 31 has become unstable, the temperature of the hot water in the tank after the boiling time can be attained to a target value if the quantity of heat to be given to the mean flow rate of the to-be-heated liquid is properly designed. Thus, when the temperature of the to-be-heated liquid is increased by bringing the to-be-heated liquid flow channel 31 and the heat medium liquid flow channel 32 into contact with each other, hunting of the amount of operation of a heat source apparatus for the heat medium may be avoided by controlling the heat source apparatus using the mean temperature of the hot water in the tank rather than the temperature of the hot water at the exit of the to-be-heated liquid flow channel 31.

In this first embodiment, a waveform of the pulsation close to that of a pulse wave was given, as shown in FIG. 2. Substantially the same effect is achieved if the waveform of the pulsation is that of a rectangular wave or a sine wave.

The water heater 110 in the above-mentioned first embodiment includes the hot water supply tank for storing the to-be-heated liquid, the heater for increasing the temperature of the to-be-heated liquid, the circulation flow channel for circulating the to-be-heated liquid, liquid driving device for causing the to-be-heated liquid in the circulation flow channel to be circulated, and control device for adjusting the flow rate of the to-be-heated liquid. Then, the control device pulsates the flow of the to-be-heated liquid and also controls the mean flow rate of the to-be-heated liquid so that the number of times of circulation of the to-be-heated liquid in the system is three times or less within the predetermined temperature rise time (time until when the to-be-heated liquid within the tank reaches the predetermined temperature). According to this configuration, by applying the pulsation to the flow of the to-be-heated liquid circulating between the hot water supply tank and the heater, the scale that has been deposited on the inner wall (heat-transfer surface) of the to-be-heated liquid flow channel in the heater may be detached. Further, by reducing the number of times of circulation of the to-be-heated liquid between the hot water supply and the heater, the detached scale may be prevented from adhering to the inner wall of the to-be-heated flow channel in the heater again. This arrangement may clearly reduce lowering of the heat transfer performance and obstruction of the flow channel due to readhesion of the scale.

Second Embodiment

A water heater 120 in a second embodiment will be described with reference to FIG. 6. In the water heater 120 in the second embodiment, the pump 2, a valve 7, and a control apparatus 6a constitute a distribution control unit 102. In the first embodiment, the control apparatus 6 (pump control apparatus) controls the operation of the pump itself to produce pulsation of the to-be-heated liquid. A method of applying the pulsation is not limited to this method. In the second embodiment, opening or closing of the flow rate adjustment value is controlled to produce pulsation of the to-be-heated liquid, and the number of times of circulation is also controlled to be three times or less.

Figure 6:
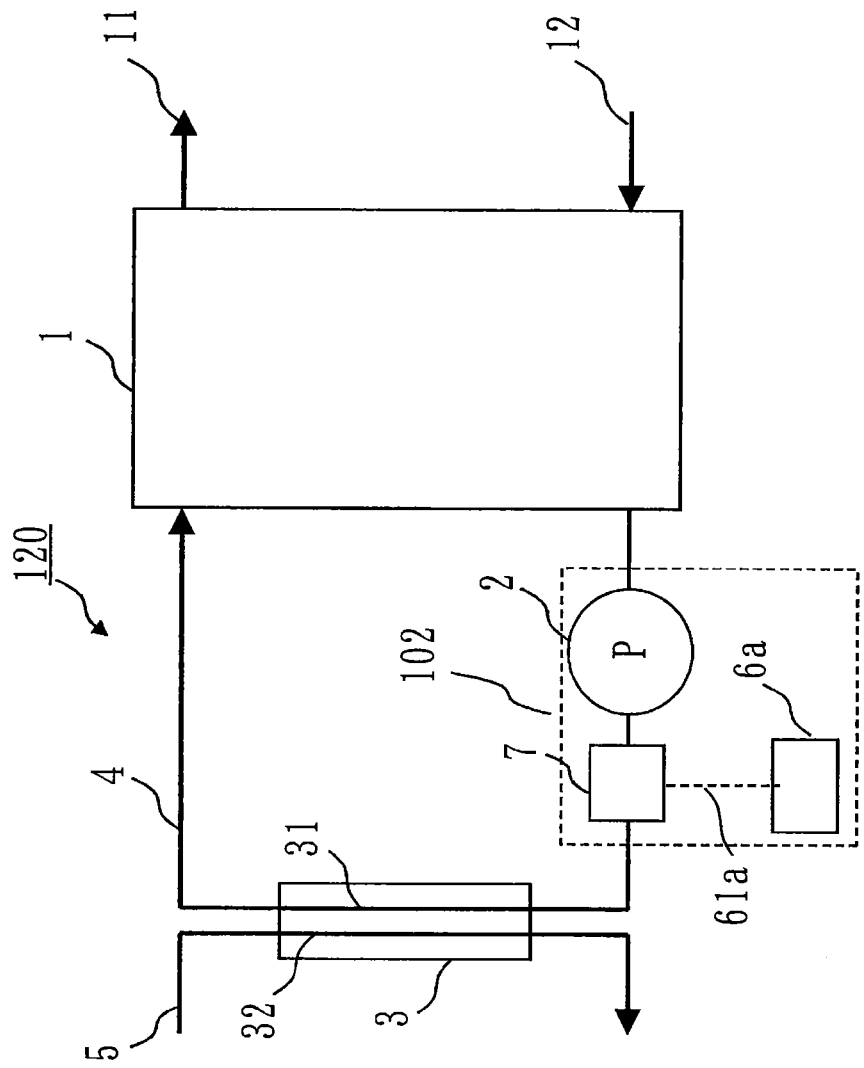
FIG. 6 is a configuration diagram of a water heater 120 in a second embodiment.

FIG. 6 shows a configuration diagram of the water heater 120 in the second embodiment. In the second embodiment, the valve 7 (flow rate adjusting valve) is disposed between the heat exchanger 3 in the to-be-heated liquid circulation piping 4 and the pump 2. The control apparatus 6a controls the opening or closing operations of the valve 7. The control apparatus 6a is connected to the valve 7 through a signal line 61a. The other configurations are the same as those in FIG. 1. With the configuration as shown in FIG. 6, the control apparatus 6a controls an opening degree of the valve 7, thereby allowing production of the pulsation similar to that in the first embodiment for to-be-heated liquid.

As described above, in the second embodiment, the distribution control unit 102 is constituted from the pump 2, the valve 7, and the control apparatus 6a. The pump 2 is disposed midway in the to-be-heated liquid circulation piping 4 to distribute the to-be-heated liquid stored in the tank 1 into the to-be-heated liquid circulation piping 4. The valve 7 is disposed midway in the to-be-heated liquid circulation piping 4 on one of the suction side and the discharge side of the pump 2 and is then controlled to adjust the flow rate of the to-be-heated liquid. The control apparatus 6a controls the valve 7, thereby controlling the flow rate of the to-be-heated liquid. The pulsation to the to-be-heated liquid is thereby produced.

Third Embodiment

A water heater 130 in a third embodiment will be described with reference to FIG. 7. In the third embodiment, by adjusting a flow rate of a bypath channel to produce pulsation to the to-be-heated liquid, and the number of times of circulation is controlled to be three times or less.

Figure 7:
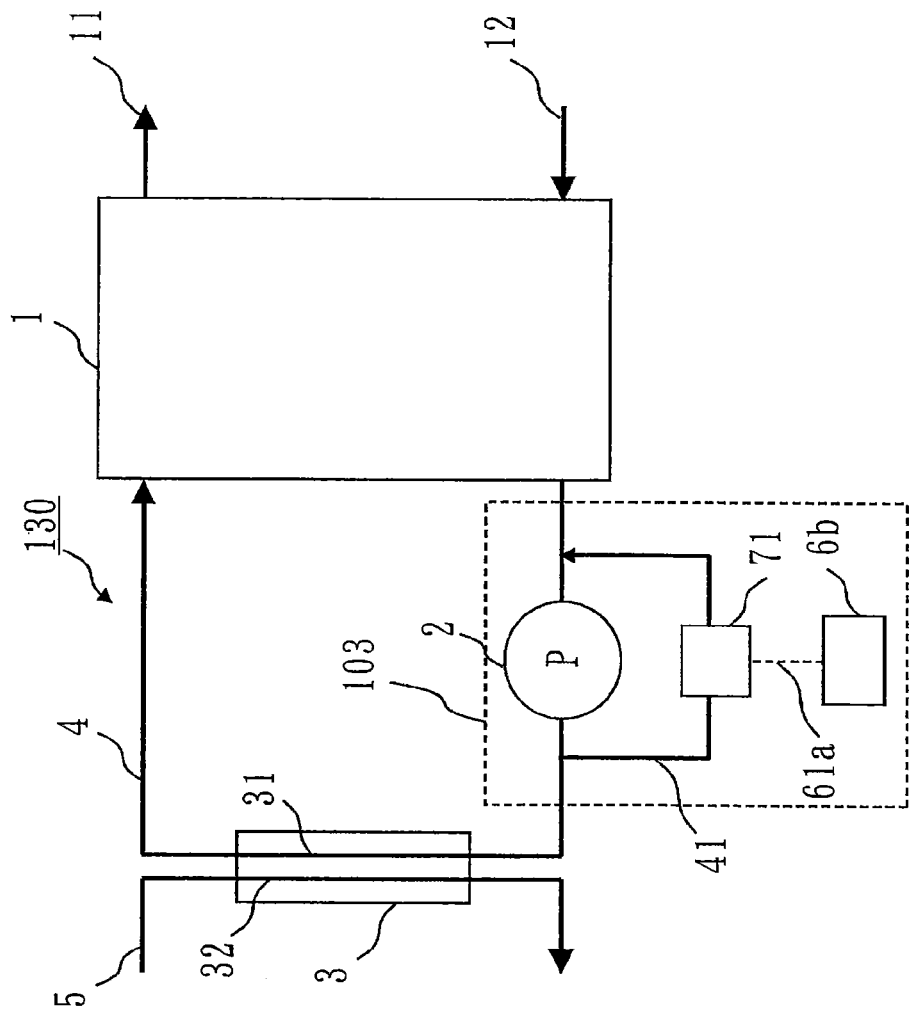
FIG. 7 is a configuration diagram of a water heater 130 in a third embodiment.

FIG. 7 shows a configuration diagram of the water heater 130 in the third embodiment. In the third embodiment, a distribution control unit 103 includes the pump 2, a bypass pipe 41 (bypass piping), a valve 71 (bypass flow rate adjusting valve), and a control apparatus 6b (bypass flow rate adjusting valve control apparatus). The pump 2 is disposed midway in the to-be-heated liquid circulation piping 4 on the inlet side of the heat exchanger 3 to distribute the to-be-heated liquid stored in the tank 1 into the to-be-heated liquid circulation piping 4. The bypass pipe 41 (bypass piping) forms the bypass flow channel that bypasses the to-be-heated liquid from the discharge side of the pump 2 to the suction side of the pump 2. The valve 71 is disposed midway in the bypass pipe 41, and is controlled by the control apparatus 6b to adjust the flow rate of the to-be-heated liquid flowing in the bypass pipe 41. The control apparatus 6b controls an opening degree of the valve 71, thereby controlling the flow rate of the to-be-heated liquid that flows in the to-be-heated liquid circulation piping 4. Pulsation to the to-be-heated liquid is thereby produced. The other configurations are the same as those in FIG. 1.

Operation of the third embodiment will be described. When the control apparatus 6b opens the valve 71, the to-be-heated liquid flows into the bypass pipe 41. Thus, the flow rate of the to-be-heated liquid that will flow into the to-be-heated liquid flow channel 31 of the heat exchanger 3 is reduced. On the contrary, when the control apparatus 6b closes the valve 71, the to-be-heated liquid does not flow into the bypass pipe 41. Thus, the flow rate of the to-be-heated liquid that will flow into the to-be-heated liquid flow channel 31 of the heat exchanger 3 increases. By repeating this opening or closing operation, the pulsation may be produced and the number of times of circulation may be controlled to be three times or less, as in the first embodiment.

Fourth Embodiment

A water heater 140 in a fourth embodiment will be described with reference to FIG. 8. In the water heater 140, the pump 2 and the control apparatus 6 constitute the distribution control unit 101, as in the water heater 110.

Figure 8:
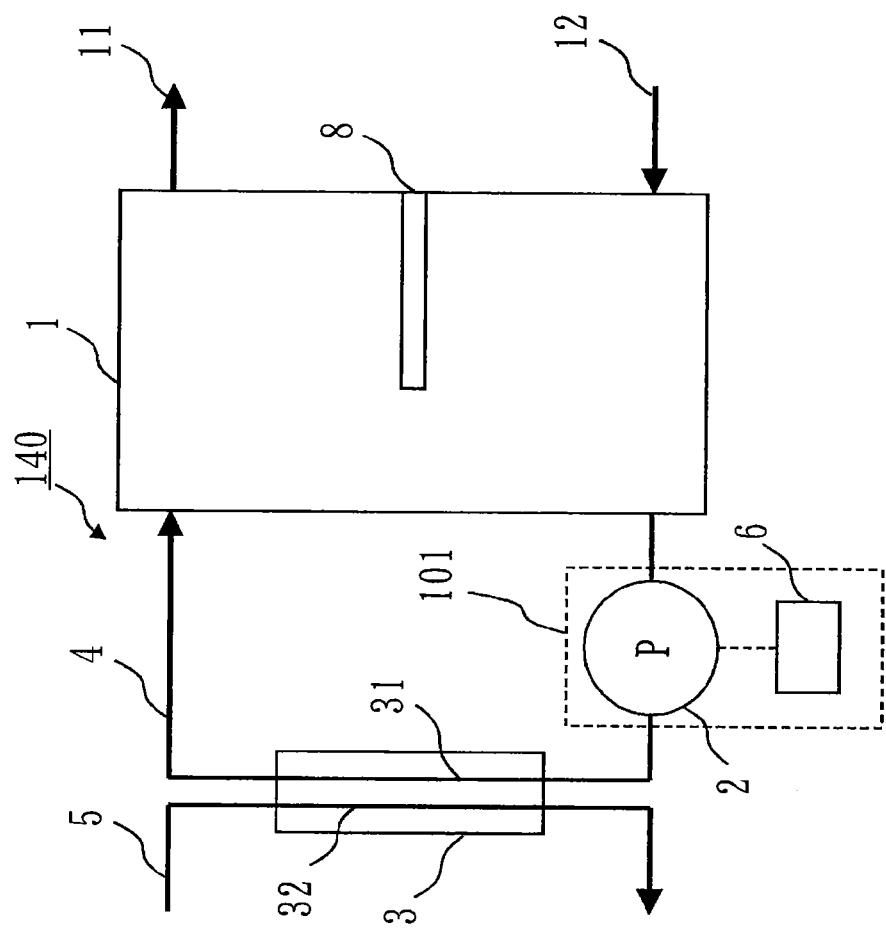
FIG. 8 is a configuration diagram of a water heater 140 in a fourth embodiment.

FIG. 8 shows a configuration diagram of the water heater 140 in the fourth embodiment. Except that an auxiliary heating apparatus 8 (such as an electric heater) is provided in the tank 1, the fourth embodiment has the same configuration as that in FIG. 1.

Operation of the fourth embodiment will be described. In this fourth embodiment, the "number of times of circulation" of the to-be-heated liquid is permitted to be four times or less. In return, an amount of heating the liquid is so adjusted that a temperature of hot water at the exit of the to-be-heated liquid flow channel 31 is a predetermined temperature or less. A shortfall in quantity of heat is supplied from the auxiliary heating apparatus 8, thereby increasing a temperature of the hot water in the tank 1 to the predetermined temperature. With this arrangement, lowering of heat transfer performance and obstruction of the flow channel due to scale adhesion in the to-be-heated liquid flow channel 31 may be reduced.

REFERENCE SIGNS LIST

1: tank
11: hot water discharge piping
12: tap water piping
101, 102, 103, 104: distribution control unit
110, 120, 130, 140: water heater
2: pump
3: heat exchanger
31: to-be-heated liquid flow channel
32: heat medium flow channel
4: to-be-heated liquid circulation piping
5: heat medium piping
6: control apparatus
61: signal line

The invention claimed is:
1. A water heater comprising:
a tank which stores a liquid to be heated;
a heater disposed midway in a to-be-heated liquid piping to form a flow channel through which the to-be-heated liquid flown out from the tank flows into the tank again, the heater including a heating flow channel, the to-be-heated liquid flown out from the tank into the to-be-heated liquid piping flowing into the heating flow channel where a temperature of the to-be-heated liquid is increased, and then the to-be-heated liquid being flown into the to-be-heated piping on an inlet side of the tank; and
a distribution control unit which distributes the to-be-heated liquid stored in the tank into the to-be-heated liquid piping,
wherein the distribution control unit controls a flow rate of the to-be-heated liquid which passes through the heating flow channel of the heater, thereby pulsating, within a boiling time, the to-be-heated liquid which circulates through the flow channel including the tank and the heater, and which passes through the heating flow channel of the heater, wherein the boiling time being set as a time to be taken for an entire volume of the to-be-heated liquid to reach a predetermined temperature, and wherein the distribution control unit controls the flow rate of the to-be-heated liquid which passes through the heating flow channel of the heater so that the entire volume of the to-be-heated liquid stored in the tank passes through the heater a predetermined number of times or less within the boiling time.

2. The water heater according to claim 1, wherein the distribution control unit controls the flow rate of the to-be-heated liquid that passes through the heating flow channel of the heater so that the entire volume of the to-be-heated liquid stored in the tank passes through the heater at most three times within the boiling time.

3. The water heater according to claim 1, wherein the distribution control unit cyclically pulsates the to-be-heated liquid in a predetermined cycle TC, and pulsates the to-be-heated liquid so that the cycle TC is 10 seconds or less.

4. The water heater according to claim 3, wherein when cyclically pulsating the to-be-heated liquid, the distribution control unit pulsates the to-be-heated liquid so that a pulsation waveform indicating a time variation of the flow rate of the to-be-heated liquid that passes through the heating flow channel of the heater per unit time approaches any one of waveforms of a pulse wave, a rectangular wave, and a sine wave.

5. The water heater according to claim 1, wherein the distribution control unit cyclically pulsates the to-be-heated liquid in the predetermined cycle TC where a maximum flow rate UH and a minimum flow rate UL occur, and pulsates the to-be-heated liquid so that a ratio UH/UL between a value of the maximum flow rate UH and a value of the minimum flow rate UH is two or more.

6. The water heater according to claim 1, wherein the distribution control unit controls the flow rate of the to-be-heated liquid which passes through the heating flow channel of the heater so that the entire volume of the to-be-heated liquid stored in the tank passes through the heater at most four times within the boiling time; and the tank includes an auxiliary heating apparatus which heats the to-be-heated liquid stored in the tank.

7. The water heater according to claim 1, wherein the distribution control unit comprises:

a pump which is disposed midway in the to-be-heated liquid piping and distributes the to-be-heated liquid stored in the tank into the to-be-heated liquid piping; and a pump control apparatus which controls the flow rate of the to-be-heated liquid to be distributed by the pump, by controlling the pump.

8. The water heater according to claim 1, wherein the distribution control unit comprises:

a pump which is disposed midway in the to-be-heated liquid piping and distributes the to-be-heated liquid stored in the tank into the to-be-heated liquid piping;

a flow rate adjusting valve disposed midway in the to-be-heated liquid piping on one of a suction side and a discharge side of the pump, the flow rate adjusting valve being controlled to adjust the flow rate of the to-be-heated liquid; and a valve control apparatus which controls the flow rate of the to-be-heated liquid by controlling the flow rate adjusting valve.

9. The water heater according to claim 1, wherein the distribution control unit comprises:

a pump which is disposed midway in the to-be-heated liquid piping on an inlet side of the heater and distributes the to-be-heated liquid stored in the tank into the to-be-heated liquid piping;

a bypass piping which forms a bypass flow channel that bypasses the to-be-heated liquid from a discharge side of the pump to a suction side of the pump;

a bypass flow rate adjusting valve disposed midway in the bypass piping, the bypass flow rate adjusting valve being controlled to adjust a flow rate of the to-be-heated liquid flowing through the bypass piping; and a bypass flow rate adjusting valve control apparatus which controls the flow rate of the to-be-heated liquid that flows in the to-be-heated liquid piping by controlling the bypass flow rate adjusting valve.

10. A method of controlling a flow rate of a liquid to be heated by a water heater, the water heater comprising:

a tank which stores the to-be-heated liquid;

a heater disposed midway in a to-be-heated liquid piping to form a flow channel through which the to-be-heated liquid flown out from the tank flows into the tank again, the heater including a heating flow channel, the to-be-heated liquid flown out from the tank into the to-be-heated liquid piping flowing into the heating flow channel where a temperature of the to-be-heated liquid is increased, and then the to-be-heated liquid being flown into the to-be-heated piping on an inlet side of the tank; and a distribution control unit which distributes the to-be-heated liquid stored in the tank into the to-be-heated liquid piping;

the method being executed by the distribution control unit of the water heater, the method comprising:

controlling a flow rate of the to-be-heated liquid which passes through the heating flow channel of the heater, thereby pulsating, within a boiling time, the to-be-heated liquid which circulates through the flow channel including the tank and the heater, and which passes through the heating flow channel of the heater, the boiling time being set as a time to be taken for an entire volume of the to-be-heated liquid to reach a predetermined temperature; and controlling the flow rate of the to-be-heated liquid which passes through the heating flow channel of the heater so that the entire volume of the to-be-heated liquid stored in the tank passes through the heater a predetermined number of times or less within the boiling time.

* * * * *